United States Patent
Bendixen et al.

(10) Patent No.: US 9,615,232 B2
(45) Date of Patent: Apr. 4, 2017

(54) SUBSCRIBER IDENTITY MODULE DATA ROUTING DEVICES, METHODS FOR ROUTING SUBSCRIBER IDENTITY MODULE DATA, CONTROL CIRCUITS, AND METHODS FOR CONTROLLING A CHANGE OF A ROUTING

(71) Applicant: Intel IP Corporation, Santa Clara, CA (US)

(72) Inventors: Carsten Bendixen, Aalborg Oest (DK); Bent Henneberg Rysgaard, Aalborg Oest (DK); Flemming Dunker, Bronderslev (DK)

(73) Assignee: INTEL IP CORPORATION, Santa Clara, CA (US)

( * ) Notice: Subject to any disclaimer, the term of this patent is extended or adjusted under 35 U.S.C. 154(b) by 56 days.

(21) Appl. No.: 14/045,955

(22) Filed: Oct. 4, 2013

(65) Prior Publication Data

US 2015/0099559 A1 Apr. 9, 2015

(51) Int. Cl.
*H04M 1/00* (2006.01)
*H04W 4/20* (2009.01)
*H04B 1/38* (2015.01)
*H04W 76/02* (2009.01)
*H04W 4/00* (2009.01)

(52) U.S. Cl.
CPC .............. *H04W 4/20* (2013.01); *H04B 1/38* (2013.01); *H04W 76/023* (2013.01); *H04W 4/003* (2013.01)

(58) Field of Classification Search
USPC .......... 455/411, 418–419, 550.1, 551, 553.1, 455/557, 558, 559
See application file for complete search history.

(56) References Cited

U.S. PATENT DOCUMENTS

| | | | |
|---|---|---|---|
| 8,750,931 B2* | 6/2014 | Park ..................... | H04W 8/183 455/552.1 |
| 9,292,067 B2* | 3/2016 | Park ........................ | G06F 1/26 |
| 2009/0215472 A1* | 8/2009 | Hsu ..................... | G06K 19/0701 455/458 |
| 2009/0270130 A1* | 10/2009 | Lee ....................... | H04W 12/06 455/558 |

(Continued)

OTHER PUBLICATIONS

Technical Specification; Smart Cards; UICC-Terminal interface; Physical and logical characteristics, Release 11, ETSI TS 102 221, V11.0.0, Jun. 2012, (Sections 5 and 6, and Annex B), 181 pages.

(Continued)

*Primary Examiner* — Dai A Phuong
(74) *Attorney, Agent, or Firm* — Viering, Jentschura & Partner mbB

(57) ABSTRACT

A subscriber identity module data routing device is described comprising: a routing circuit configured to provide a routing of input data to a plurality of subscriber identity modules; a routing change feasibility determination circuit configured to determine based on the input data whether a change of the routing is feasible, in response to receiving a request for the change of the routing; and wherein the routing circuit is further configured to change the routing if the routing change feasibility determination circuit determines that the change of the routing is feasible.

21 Claims, 5 Drawing Sheets

(56) References Cited

U.S. PATENT DOCUMENTS

| | | | |
|---|---|---|---|
| 2010/0105433 A1 | 4/2010 | Lin et al. | |
| 2011/0287807 A1* | 11/2011 | Jung | H04B 1/0064 455/557 |
| 2012/0115546 A1* | 5/2012 | Lin | G06K 19/0701 455/558 |
| 2012/0182938 A1* | 7/2012 | Mujtaba | H04W 88/06 370/328 |
| 2013/0109436 A1 | 5/2013 | Tat et al. | |
| 2013/0150126 A1* | 6/2013 | Pattaswamy | H04W 8/183 455/558 |
| 2013/0203461 A1* | 8/2013 | Li | H04W 88/06 455/552.1 |
| 2013/0260830 A1* | 10/2013 | Zhao | H04B 1/48 455/558 |
| 2013/0344918 A1* | 12/2013 | Tat | H04W 8/183 455/558 |
| 2014/0004903 A1* | 1/2014 | Tsai | H04B 1/3816 455/558 |
| 2014/0036710 A1* | 2/2014 | Chin | H04W 24/10 370/252 |
| 2014/0120859 A1* | 5/2014 | Ekici et al. | 455/404.1 |
| 2014/0140287 A1* | 5/2014 | Cheng | H04W 76/02 370/329 |
| 2014/0146667 A1* | 5/2014 | Zhang | H04W 68/12 370/230 |
| 2014/0187286 A1* | 7/2014 | Venugopal | H04M 1/274516 455/552.1 |
| 2014/0194118 A1* | 7/2014 | Liu | H04W 36/18 455/435.1 |
| 2014/0248922 A1* | 9/2014 | Josso | H04W 68/02 455/552.1 |
| 2015/0057046 A1* | 2/2015 | Challa | H04W 4/001 455/558 |
| 2015/0063174 A1* | 3/2015 | Han | H04B 1/006 370/277 |
| 2015/0072670 A1* | 3/2015 | Kelley | 455/418 |

OTHER PUBLICATIONS

"Information technology—Identification cards—Integrated circuit(s) cards with contacts" ISO/IEC 7816-4, International Standard, First edition Sep. 1, 1995, Amendment 1, Dec. 15, 1997, 12 pages.

3rd Generation Partnership Project; "Technical Specification Group Core Network and Terminals; Characteristics of the Universal Subscriber Identity Module (USIM) application" Release 12, V12.1.0, (Sep. 2013), 230 pages.

Technical Specification; Smart Cards; ETSI numbering system for telecommunication application providers, Release 11, ETSI TS 101 220, V11.1.0, Sep. 2012.

German Office Action based on Application No. 10 2014 113 923.2(5 pages) dated Nov. 4, 2016 (Reference Purpose Only).

\* cited by examiner

US 9,615,232 B2

SUBSCRIBER IDENTITY MODULE DATA ROUTING DEVICES, METHODS FOR ROUTING SUBSCRIBER IDENTITY MODULE DATA, CONTROL CIRCUITS, AND METHODS FOR CONTROLLING A CHANGE OF A ROUTING

TECHNICAL FIELD

The present disclosure generally relates to subscriber identity module data routing devices, methods for routing subscriber identity module data, control circuits, and methods for controlling a change of a routing.

BACKGROUND

In a multi SIM (subscriber identity module) mobile wireless product featuring multiple modems to achieve simultaneous active connections (MSMA—Multi SIM, Multi Active), each SIM card can be either statically allocated to one modem, or dynamically allocated between modems. In the latter case, a multiplexer switches the SIM data-paths between the various SIM cards and modems. Thus, there may be a need for an efficient and effective switching between the various SIM cards and modems.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

Figure 1:
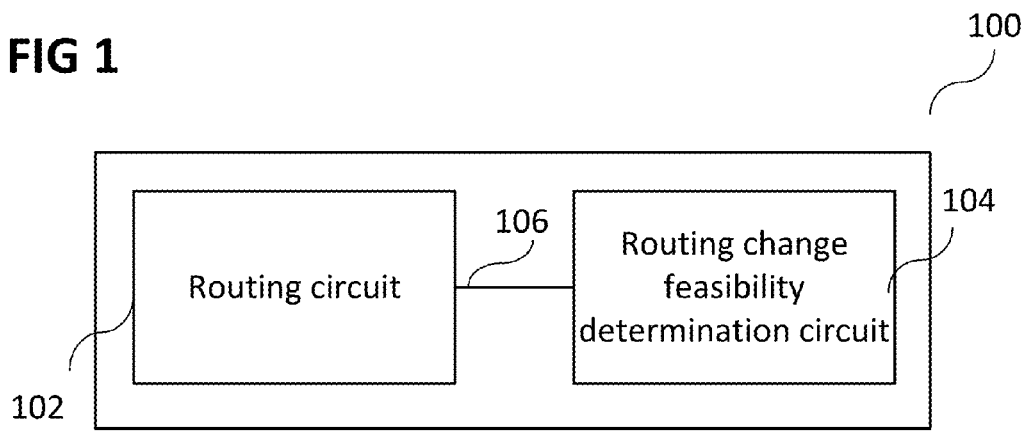
FIG. 1 shows a subscriber identity module data routing device.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The subscriber identity module data routing device may include a memory which may for example be used in the processing carried out by the subscriber identity module data routing device. The control circuit may include a memory which may for example be used in the processing carried out by the control circuit. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

It will be understood that although a SIM (subscriber identity module) may be provided on a separate card (which may be referred to as SIM card), a SIM may also be provided integrated on any other device. Thus, it will be understood that what is described with respect to a "SIM card" is not restricted to the SIM being provided on a separate card, but the SIM may also be provided integrated on any other device, for example in the case of a soft SIM.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

In a multi SIM mobile wireless product featuring multiple modems to achieve simultaneous active connections (MSMA—Multi SIM, Multi Active), each SIM card can be either statically allocated to one modem, or dynamically allocated between modems.

For example, one baseband may hold exclusive ownership over one or more SIM cards. Ownership of SIM cards may be exclusive and may be cumbersome to be transferred between basebands; a reason for this may be that, in a regular configuration, transfer between basebands may require the deactivation of the SIM by one baseband followed by a new activation of the SIM by the other baseband, thereby possible requiring PIN verification, if enabled, and thereby implicitly requiring undesired user interaction.

For systems with dynamic allocation on SIMs and modems, a multiplexer may switch the SIM data-paths between the various SIM cards and modems. This multiplexer may be controlled by an application processor (AP), which based on user interaction through the user interface, may set the SIM data-path according to the users preference.

In commonly used systems, the application processor is not aware of ongoing data transmissions between modem and SIM card, so in order not to switch the data-path during active transmission, and thereby violate the SIM signal activation and deactivation sequences prescribed in the relevant 3GPP (Third generation partnership project) and ISO (International Organization for Standardization) standards, the AP requests each modem to de-register from the network, and deactivates the SIM cards over the Inter-Processor-Communication Interface (IPC) between application processor and modem(s), and waits for confirmation from the modem(s) before switching the SIM data-paths. This means that in commonly used systems, there is no real-time protection of the SIM data-path against accidental switching in the midst of an active SIM data transaction, an event which could cause data corruption in the SIM card.

An efficient and effective switching between the various SIM cards and modems may be provided.

A device equipped with two basebands and multiple SIM card slots may include a SIM signal multiplexer to multiplex the signals between the basebands and the SIMs. It may allow for seamless switching of the exclusive ownership of SIM cards between the two basebands without user interaction, accomplished by ensuring that the SIM is not deactivated during the switch.

FIG. 1 shows a subscriber identity module data routing device 100. The subscriber identity module data routing device 100 may include a routing circuit 102 configured to provide a routing of input data to a plurality of subscriber identity modules. The subscriber identity module data routing device 100 may further include a routing change feasibility determination circuit 104 configured to determine based on the input data whether a change of the routing is feasible, in response to receiving a request for the change of the routing. The routing circuit 104 may change the routing if the routing change feasibility determination circuit determines that the change of the routing is feasible. The routing circuit 102 and the routing change feasibility determination circuit 104 may be coupled with each other, for example via a connection 106, for example an optical connection or an electrical connection, such as for example a cable or a computer bus or via any other suitable electrical connection to exchange electrical signals.

The subscriber identity module data routing device may further include an input data receiver (not shown) configured to receive the input data for the plurality of subscriber identity modules.

The subscriber identity module data routing device 100 may further include a routing change request receiver (not shown) configured to receive the request for the change of the routing.

The routing change feasibility determination circuit 104 may determine that the change of the routing is feasible if the plurality of subscriber identity modules are in a pre-determined condition.

The pre-determined condition may include or may be a condition in which the plurality of subscriber identity modules completed execution of all commands that were received. This may be used as in cases where the SIM's physical connections are maintained, but commands routed to the SIM originate from different baseband units. Then it is essential to properly terminate commands (or in case of sets of commands these sets of commands) originating from one baseband before routing commands from another baseband to the SIM. Otherwise undesirable side effects may occur e.g. one baseband may select a specific directory and then the other baseband may operate unintentionally on that directory and thus may not store data in the intended directory or even corrupt data in the selected directory.

The input data may include or may be a clock signal for a first subscriber identity module and a clock signal for a second subscriber identity module.

The routing change feasibility determination circuit 104 may determine that the change of the routing is feasible if the clock signal for the first subscriber identity module and the clock signal for the second subscriber identity module fulfill a pre-determined criterion.

The pre-determined criterion may include or may be that the clock signal for the first subscriber identity module and the clock signal for the second subscriber identity module are (or were) in a pre-determined state for a pre-determined period of time.

The pre-determined state may be a high state.

The pre-determined state may be a low state.

The pre-determined period of time may include or may be a time corresponding to a pre-determined number of clock cycles.

The pre-determined number of clock cycles may be 1860.

The input data may include or may be a supply voltage for a first subscriber identity module and a supply voltage for a second subscriber identity module.

The routing change feasibility determination circuit 104 may determine that the change of the routing is feasible if the supply voltage for the first subscriber identity module and the supply voltage for the second subscriber identity module fulfill a pre-determined criterion.

The pre-determined criterion may include or may be that the supply voltage for the first subscriber identity module and the supply voltage for the second subscriber identity module are below a pre-determined threshold voltage.

The pre-determined threshold voltage may be 0.4 V.

The routing and the routing change feasibility circuit may be implemented as dedicated hardware, but the functionality may also be implemented in software on one or more processors which may be part of one or more of the baseband units or part of an application processor.

Figure 2:
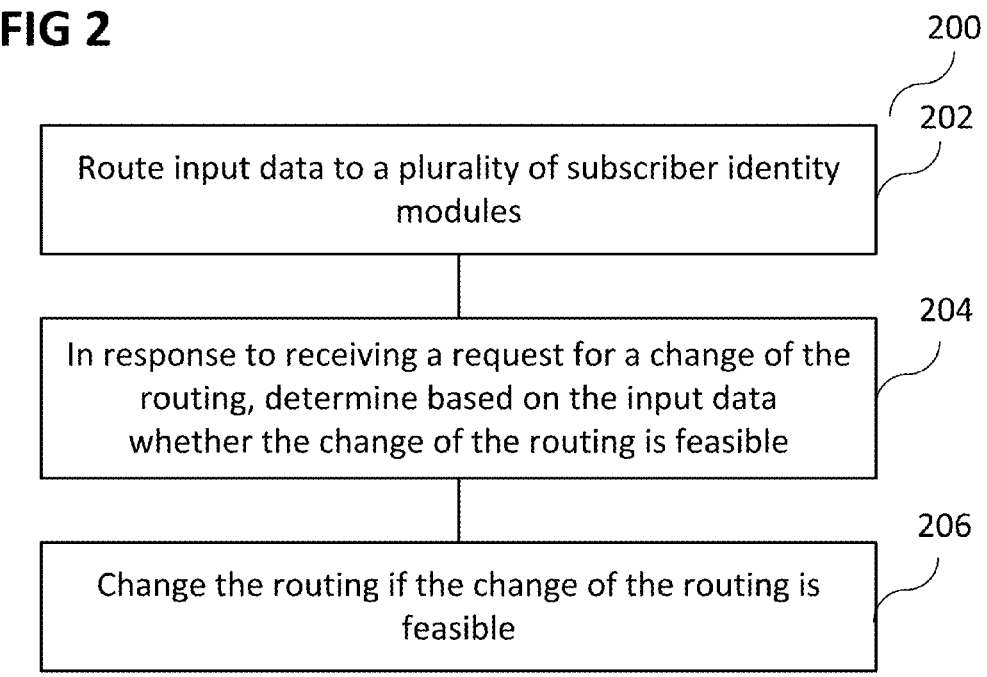
FIG. 2 shows a flow diagram illustrating a method for routing subscriber identity module data.

FIG. 2 shows a flow diagram 200 illustrating a method for routing subscriber identity module data. In 202, a routing circuit may route input data to a plurality of subscriber identity modules. In 204, a routing change feasibility determination circuit may, in response to receiving a request for a change of the routing, determine based on the input data whether the change of the routing is feasible. In 206, the routing circuit may change the routing if the change of the routing is feasible.

The method may further include: determining that the change of the routing is feasible if the plurality of subscriber identity modules are in a pre-determined condition.

The pre-determined condition may include or may be a condition in which the plurality of subscriber identity modules completed execution of all commands that were received.

The input data may include or may be a clock signal for a first subscriber identity module and a clock signal for a second subscriber identity module.

The method may further include: determining that the change of the routing is feasible if the clock signal for the first subscriber identity module and the clock signal for the second subscriber identity module fulfill a pre-determined criterion.

The pre-determined criterion may include or may be that the clock signal for the first subscriber identity module and the clock signal for the second subscriber identity module are (or were) in a pre-determined state for a pre-determined period of time.

The pre-determined state may be a high state.

The pre-determined state may be a low state.

The pre-determined period of time may include or may be a time corresponding to a pre-determined number of clock cycles.

The pre-determined number of clock cycles may be 1860.

The input data may include or may be a supply voltage for a first subscriber identity module and a supply voltage for a second subscriber identity module.

The method may further include: determining that the change of the routing is feasible if the supply voltage for the first subscriber identity module and the supply voltage for the second subscriber identity module fulfill a pre-determined criterion.

The pre-determined criterion may include or may be that the supply voltage for the first subscriber identity module and the supply voltage for the second subscriber identity module are below a pre-determined threshold voltage.

The pre-determined threshold voltage may be 0.4 V.

Figure 3:
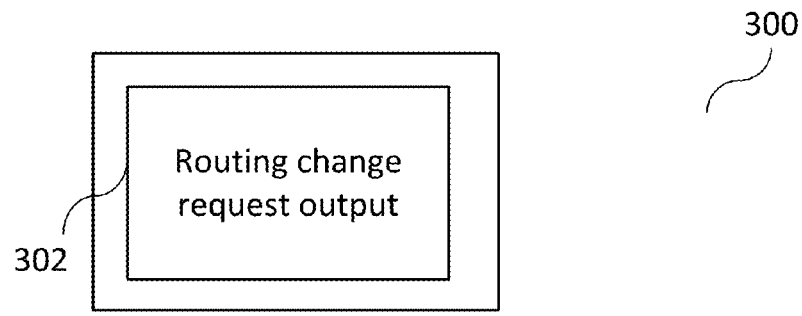
FIG. 3 shows a control circuit.

FIG. 3 shows a control circuit 300. The control circuit 300 may include a routing change request output 302 configured to output a request for a change of a routing based on the received request and received input data, in response to receiving the request for the change of the routing of input data to a plurality of subscriber identity modules.

The routing change request output 306 may output the request if the plurality of subscriber identity modules are in a pre-determined condition.

The pre-determined condition may include or may be a condition in which the plurality of subscriber identity modules completed execution of all commands that were received.

The input data may include or may be a clock signal for a first subscriber identity module and a clock signal for a second subscriber identity module.

The routing change request output 306 may output the request if the clock signal for the first subscriber identity module and the clock signal for the second subscriber identity module fulfill a pre-determined criterion.

The pre-determined criterion may include or may be that the clock signal for the first subscriber identity module and the clock signal for the second subscriber identity module are (or were) in a pre-determined state for a pre-determined period of time.

The pre-determined state may be a high state.

The pre-determined state may be a low state.

The pre-determined period of time may include or may be a time corresponding to a pre-determined number of clock cycles.

The pre-determined number of clock cycles may be 1860.

The input data may include or may be a supply voltage for a first subscriber identity module and a supply voltage for a second subscriber identity module.

The routing change request output 306 may output the request if the supply voltage for the first subscriber identity module and the supply voltage for the second subscriber identity module fulfill a pre-determined criterion.

The pre-determined criterion may include or may be that the supply voltage for the first subscriber identity module and the supply voltage for the second subscriber identity module are below a pre-determined threshold voltage.

The pre-determined threshold voltage may be 0.4 V.

Figure 4:
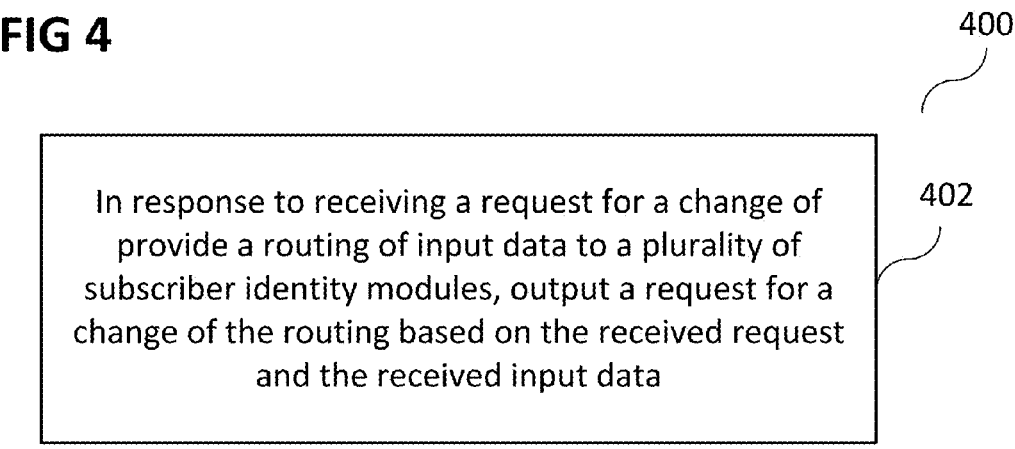
FIG. 4 shows a flow diagram illustrating a method for controlling a change of a routing.

FIG. 4 shows a flow diagram 400 illustrating a method for controlling a change of a routing. In 402, a routing change request output may, in response to receiving a request for a change of provide a routing of input data to a plurality of subscriber identity modules, output a request for a change of the routing based on the received request and the received input data.

The method may further include: outputting the request if the plurality of subscriber identity modules are in a pre-determined condition.

The pre-determined condition may include or may be a condition in which the plurality of subscriber identity modules completed execution of all commands that were received.

The input data may include or may be a clock signal for a first subscriber identity module and a clock signal for a second subscriber identity module.

The method may further include: outputting the request if the clock signal for the first subscriber identity module and the clock signal for the second subscriber identity module fulfill a pre-determined criterion.

The pre-determined criterion may include or may be that the clock signal for the first subscriber identity module and the clock signal for the second subscriber identity module are (or were) in a pre-determined state for a pre-determined period of time.

The pre-determined state may be a high state.

The pre-determined state may be a low state.

The pre-determined period of time may include or may be a time corresponding to a pre-determined number of clock cycles.

The pre-determined number of clock cycles may be 1860.

The input data may include or may be a supply voltage for a first subscriber identity module and a supply voltage for a second subscriber identity module.

The method may further include: outputting the request if the supply voltage for the first subscriber identity module and the supply voltage for the second subscriber identity module fulfill a pre-determined criterion.

The pre-determined criterion may include or may be that the supply voltage for the first subscriber identity module and the supply voltage for the second subscriber identity module are below a pre-determined threshold voltage.

The pre-determined threshold voltage may be 0.4 V.

A seamless SIM switching on Dual Baseband multiple SIM platforms may be provided. SIM signal multiplexing for Dual Baseband, Dual Mode/Dual Access, and Multi SIM may be provided, for example in dual baseband mobile modems/phones.

Figure 5:
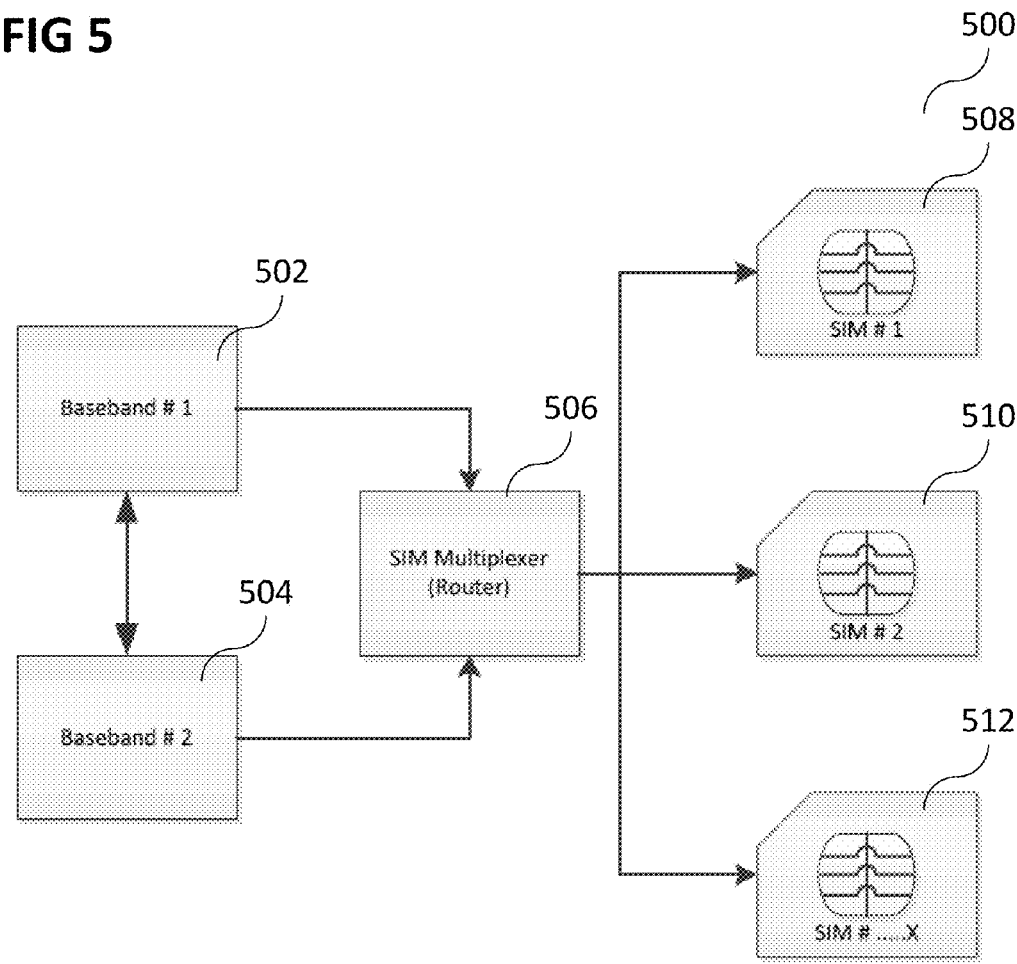
FIG. 5 and FIG. 6 show a multi SIM (subscriber identity module) system.

FIG. 5 shows a multi SIM system 500. A first baseband 502, a second baseband 502, a SIM multiplexer 506 (which may also be referred to as a router), a first SIM 508, a second SIM 510, and a third SIM 512 may be provided.

The two basebands may switch the exclusive ownership of any inserted SIM by use of the multiplexer 506. The multiplexer 506 may be provided between the basebands and the SIM cards. The multiplexer 506 may latch the SIM signals, allowing the basebands to reconfigure the physical setup to fit the particular SIM it is switching to. Furthermore, the multiplexer 506 may be able to route the SIM signals from the either of the two basebands towards any of the inserted SIM, giving the basebands the ability to hold exclusive ownership of any of the inserted SIM card.

By providing a seamless switching, the user may be kept unaware of the switch ongoing and switching thus may be done on the fly.

When basebands desire to swap the ownership of the SIMs, each baseband may set the SIM cards under its exclusive ownership in clock stop mode. The multiplexer 506 (which may for example be a multiplexer circuit or a multiplexer chip) may latch the SIM signal lines in the clock stop state (for example keeping the signals stable at their current state).

The multiplexer 506 may only do so, once the SIM card is in clock stop mode. This may be determined by the multiplexer 506 by observing that the CLK signal line has been fixed in either high or low state for a pre-determined period, for example for at least 1860 clock cycles. Once the multiplexer 506 has latched the SIM lines, the multiplexer 506 may reroute the SIM lines according to the requested setup.

The basebands may share the SIM card characteristics (for example voltage class, clock top preferences, or transmission speed parameters). As the SIM card signals are latched from the multiplexer 506, the basebands may reconfigure their physical interface to the SIM that it is taking ownership of, without compromising ongoing SIM card sessions.

Once both basebands have adapted their new SIM interface settings, the multiplexer 506 may be instructed to release its latches and the basebands may proceed to read information from the SIM. As the SIM has not been powered off, there is no need to perform PIN verification, application activation and so forth.

Additionally, if the basebands are able to share or exchange the AS (access stratum) and NAS (non-access stratum) configurations, this may allow the device to remain attached to the network, although through a different baseband.

For example as shown in FIG. 5, the first baseband 502 may be used for active mode SIMs, performing MT (mobile terminating)/MO (mobile originating) calls, ongoing while the second baseband 504 may be used for listening for paging on several idle mode SIMs.

The various methods and devices provided may have an ability to switch seamlessly between basebands and SIM cards. Routing of the SIM lines, not only from one baseband to many SIMs, but both basebands to any SIM may be provided. Furthermore, the devices and methods may ensure that the latching is only done when the clock signal has been stable, either high or low, for a pre-determined period of time, for example for 1860 clock cycles. A dynamic SIM to baseband mapping functionality may be provided.

Dynamic SIM allocation with datapath protection in applications featuring multiple modems may be provided. For example, a multi modem mobile platform with SIM datapath protection may be provided.

A HW protection scheme may be provided, which may prevent changing of the SIM data-path over the control interface from the AP, unless all connected modems present de-activated state on their respective SIM interfaces. This may be accomplished by employing analog comparators monitoring the supply voltage to the SIM cards, and preventing SIM data-path changes in case any SIM supply is active.

By applying a real-time, HW (hardware) controlled protection scheme of the SIM data-path, it may be ensured the user will not suffer data loss due to corruption of the SIM data-path, which could occur due to SW (software) "getting out of sync" between modem(s) and AP.

Figure 6:
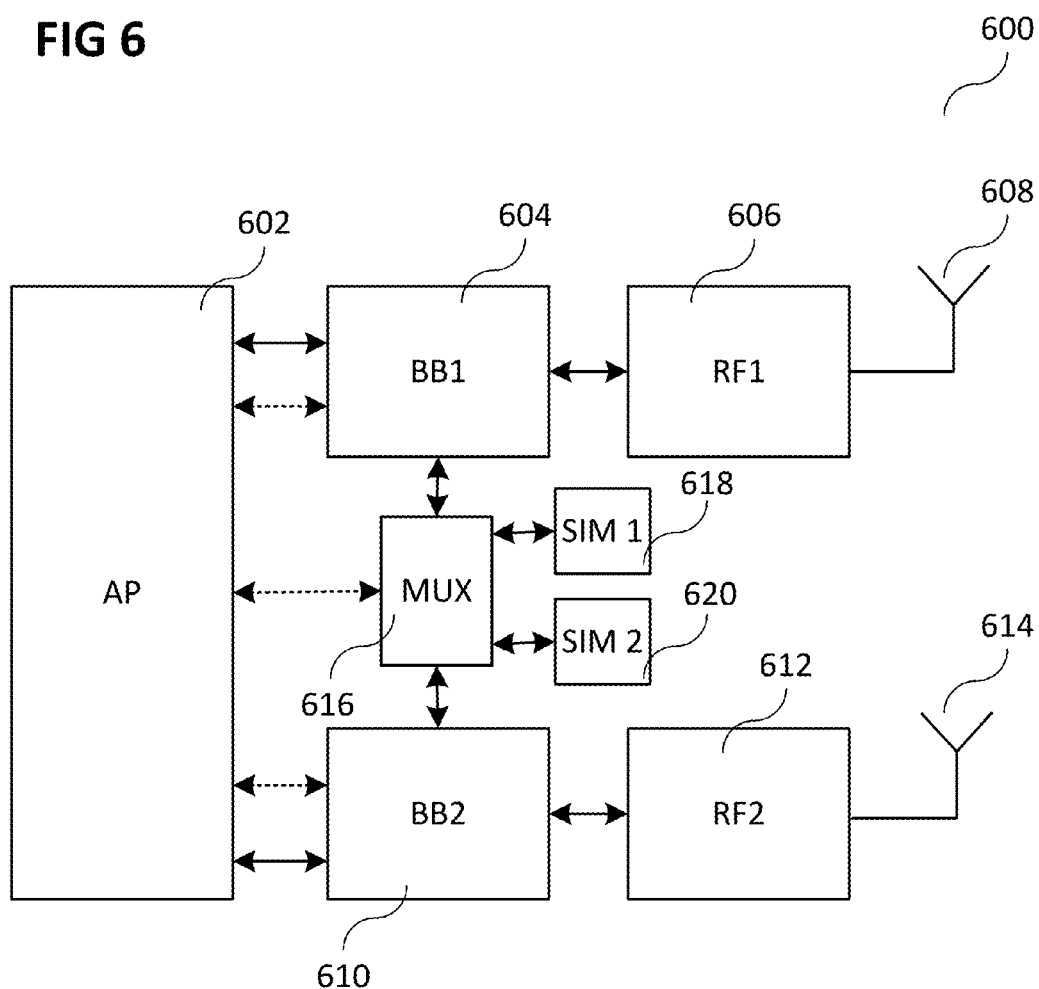
Figure 6:
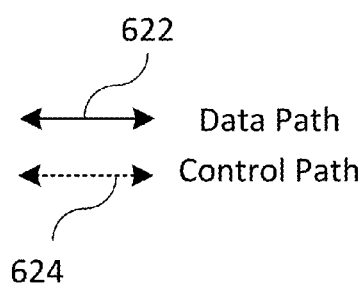

FIG. 6 shows a system 600. For example, a typical DSDA (dual SIM dual active) application, in which 2 modems including baseband (BB) and radio frequency (RF) circuits are controlled by an AP 602. For example a first modem may include a first baseband 604 and a first RF circuit 606, and a second modem may include a second baseband 610 and a second RF circuit 612. The first RF circuit 606 may use a first antenna 608 for radio communication. The second RF circuit 612 may use a second antenna 614 for radio communication. Between the modems and the SIM cards (for example a first SIM card 618 and a second SIM card 620), a multiplexer 616 may be provided, allowing configuration of the first SIM 618 to either the first baseband 604 or the second baseband 610, and allowing configuration of the second SIM 620 to either the first baseband 604 or the second baseband 610. The data-path of the multiplexer 616 may be controlled by the AP 602 over a control interface. Data paths are illustrated in FIG. 6 by solid line arrows like arrow 622. Control paths are illustrated in FIG. 6 by dashed line arrows like arrow 624.

Figure 7:
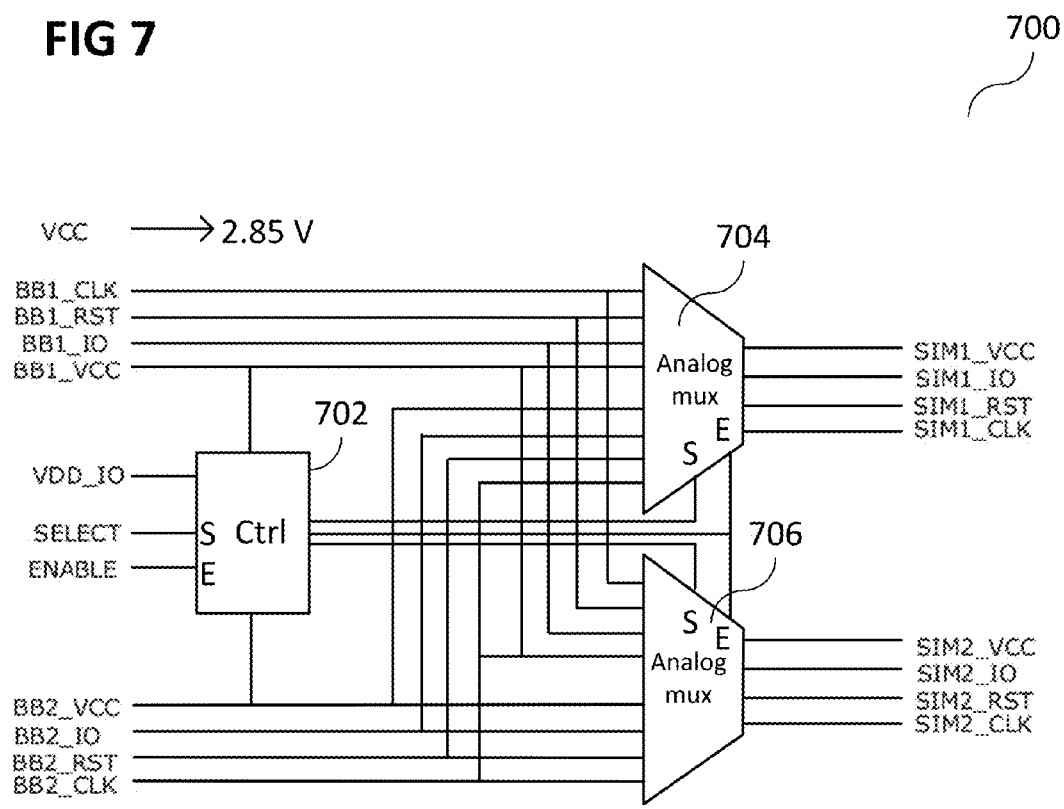
FIG. 7 shows a SIM multiplexer.

FIG. 7 shows a SIM multiplexer 700. The internal data paths of the SIM multiplexer 700 are shown. The analog multiplexers (for example a first analog multiplexer 704 and a second analog multiplexer 706) may switch SIM interface signals (for example all four SIM interface signals) between a first baseband (BB1) and a second baseband (BB2). The SIM data-path may be controlled by two control signals, "Select" and "Enable", which may be provided to a control circuit 702. The signal "Select" may provide a change of the data-path between the 2 possible states, and "Enable" may act as a power control signal. In case "Enable" is de-asserted, all data-paths may be off or isolated. In commonly used systems, changes of the data-path may take effect immediately upon changing the state of "Select" and "Enable", thus leading to the potential unwanted effects described above. VCC may be a supply voltage for the multiplexer. VCC_IO may be a supply voltage for the control circuit 702. Signals from the first baseband may be indicated by starting with BB1. Signals from the second baseband may be indicated by starting with BB2. Signals to the first SIM may be indicated by starting with SIM1. Signals to the second SIM may be indicated by starting with SIM2. CLK may indicate a clock signal. RST may indicate a reset signal. I/O may indicate a bidirectional I/O (input/output) signal. VCC may indicate a supply voltage. For example, BB1_RST may indicate a reset signal from the first baseband. For example, SIM2_CLK may indicate a clock signal to the second SIM.

Figure 8:
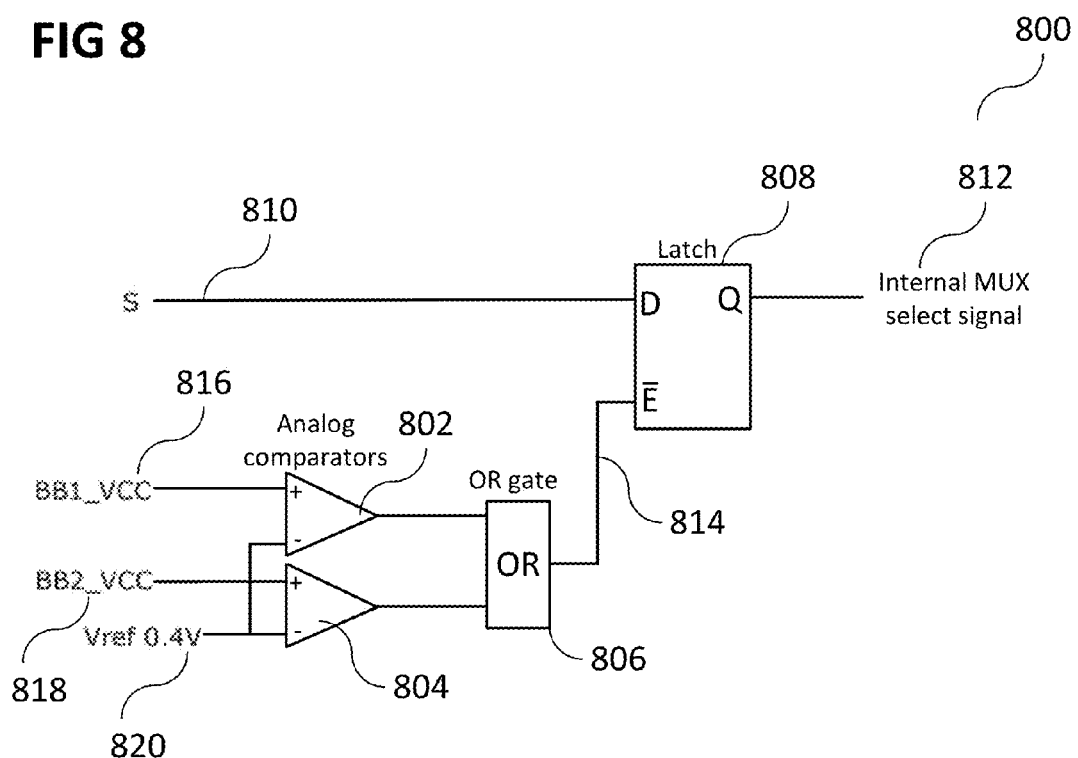
FIG. 8 shows a control circuit.

FIG. 8 shows a control circuit 800. The control circuit 800 may for example be used in the multiplexer 700 of FIG. 7 instead of the control circuit 702 shown in FIG. 7, and may provide HW protection of the data-path control. The data-path of analog multiplexers may be selected by the select input S 810. The select input 812 presented to a multiplexer MUX may only change when a latch enable signal 814 is low. Two comparators (for example a first (for example analog) comparator 802, and a second (for example analog) comparator 804) may monitor the two SIM supply voltages (for example the supply voltage BB1_VCC 816 provided by the first baseband, and the supply voltage BB2_VCC 818 provided by the second baseband), and may block the latch enable signal in case any of the supplies is at active level (for example higher than a reference voltage 820, for example higher than 0.4V). For example, the output signals of the first comparator 802 and the second comparator 804 may be input to an OR gate 806, so that if the output of the first comparator 802 and/or the output of the second comparator 804 indicates that the supply voltage is above the reference voltage (in other words, if any one of the outputs of the comparators is high), the output of the OR gate 806 (which may be the latch enable signal 814) is high. As a consequence, the SIM data-paths may only be changed when both SIM supplies have a voltage below the reference voltage (for example are OFF).

A stand-alone SIM multiplexer may be provided. The SIM multiplexer may also be provided as a part of a larger SoC (system on a chip), where the multiplexer functionality may be integrated. In addition or as an alternative to a multiplexer, any kind of selector may be implemented to select different SIMs.

The following examples pertain to further embodiments.

Example 1 is a subscriber identity module data routing device comprising: a routing circuit configured to provide a routing of input data to a plurality of subscriber identity modules; a routing change feasibility determination circuit configured to determine based on the input data whether a change of the routing is feasible, in response to receiving a request for the change of the routing; and wherein the routing circuit is further configured to change the routing if the routing change feasibility determination circuit determines that the change of the routing is feasible.

In example 2, the subject-matter of example 1 can optionally include that the routing change feasibility determination circuit is configured to determine that the change of the routing is feasible if the plurality of subscriber identity modules are (or being) in a pre-determined condition.

In example 3, the subject-matter of example 2 can optionally include that the pre-determined condition comprises a condition in which the plurality of subscriber identity modules completed execution of all commands that were received.

In example 4, the subject-matter of any one of examples 1 to 3 can optionally include that the input data comprises a clock signal for a first subscriber identity module and a clock signal for a second subscriber identity module.

In example 5, the subject-matter of example 4 can optionally include that the routing change feasibility determination circuit is configured to determine that the change of the routing is feasible if the clock signal for the first subscriber identity module and the clock signal for the second subscriber identity module fulfill a pre-determined criterion.

In example 6, the subject-matter of example 5 can optionally include that the pre-determined criterion comprises that the clock signal for the first subscriber identity module and the clock signal for the second subscriber identity module are (or were) in a pre-determined state for a pre-determined period of time.

In example 7, the subject-matter of example 6 can optionally include that the pre-determined state is a high state.

In example 8, the subject-matter of any one of examples 6 or 7 can optionally include that the pre-determined state is a low state.

In example 9, the subject-matter of any one of examples 6 to 8 can optionally include that the pre-determined period of time comprises a time corresponding to a pre-determined number of clock cycles.

In example 10, the subject-matter of example 9 can optionally include that the pre-determined number of clock cycles is 1860.

In example 11, the subject-matter of any one of examples 1 to 10 can optionally include that the input data comprises a supply voltage for a first subscriber identity module and a supply voltage for a second subscriber identity module.

In example 12, the subject-matter of example 11 can optionally include that the routing change feasibility determination circuit is configured to determine that the change of the routing is feasible if the supply voltage for the first subscriber identity module and the supply voltage for the second subscriber identity module fulfill a pre-determined criterion.

In example 13, the subject-matter of example 12 can optionally include that the pre-determined criterion comprises that the supply voltage for the first subscriber identity module and the supply voltage for the second subscriber identity module are below a pre-determined threshold voltage.

In example 14, the subject-matter of example 13 can optionally include that the pre-determined threshold voltage is 0.4 V.

Example 15 is a method for routing subscriber identity module data, the method comprising: routing input data to a plurality of subscriber identity modules; in response to receiving a request for a change of the routing, determining based on the input data whether the change of the routing is feasible; and changing the routing if the change of the routing is feasible.

In example 16, the subject-matter of example 15 can optionally include determining that the change of the routing is feasible if the plurality of subscriber identity modules are in a pre-determined condition.

In example 17, the subject-matter of example 16 can optionally include that the pre-determined condition comprises a condition in which the plurality of subscriber identity modules completed execution of all commands that were received.

In example 18, the subject-matter of any one of examples 15 to 17 can optionally include that the input data comprises a clock signal for a first subscriber identity module and a clock signal for a second subscriber identity module.

In example 19, the subject-matter of example 18 can optionally include determining that the change of the routing is feasible if the clock signal for the first subscriber identity module and the clock signal for the second subscriber identity module fulfill a pre-determined criterion.

In example 20, the subject-matter of example 19 can optionally include that the pre-determined criterion comprises that the clock signal for the first subscriber identity module and the clock signal for the second subscriber identity module are (or were) in a pre-determined state for a pre-determined period of time.

In example 21, the subject-matter of example 20 can optionally include that the pre-determined state is a high state.

In example 22, the subject-matter of any one of examples 20 to 21 can optionally include that the pre-determined state is a low state.

In example 23, the subject-matter of any one of examples 20 to 22 can optionally include that the pre-determined period of time comprises a time corresponding to a pre-determined number of clock cycles.

In example 24, the subject-matter of example 23 can optionally include that the pre-determined number of clock cycles is 1860.

In example 25, the subject-matter of any one of examples 15 to 24 can optionally include that the input data comprises a supply voltage for a first subscriber identity module and a supply voltage for a second subscriber identity module.

In example 26, the subject-matter of example 25 can optionally include determining that the change of the routing is feasible if the supply voltage for the first subscriber identity module and the supply voltage for the second subscriber identity module fulfill a pre-determined criterion.

In example 27, the subject-matter of example 26 can optionally include that the pre-determined criterion comprises that the supply voltage for the first subscriber identity module and the supply voltage for the second subscriber identity module are below a pre-determined threshold voltage.

In example 28, the subject-matter of example 27 can optionally include that the pre-determined threshold voltage is 0.4 V.

Example 29 is a subscriber identity module data routing device comprising: a routing means for providing a routing of input data to the plurality of subscriber identity modules; a routing change feasibility determination means for determining based on the input data whether the change of the routing is feasible in response to receiving a request for the change of the routing; wherein the routing means is further for changing the routing if the routing change feasibility determination circuit determines that the change of the routing is feasible.

In example 30, the subject-matter of example 29 can optionally include that the routing change feasibility determination means comprises determining that the change of the routing is feasible if the plurality of subscriber identity modules are in a pre-determined condition.

In example 31, the subject-matter of any one of examples 29 to 30 can optionally include that the pre-determined condition comprises a condition in which the plurality of subscriber identity modules completed execution of all commands that were received.

In example 32, the subject-matter of any one of examples 29 to 31 can optionally include that the input data comprises a clock signal for a first subscriber identity module and a clock signal for a second subscriber identity module.

In example 33, the subject-matter of example 32 can optionally include that the routing change feasibility determination means comprises determining that the change of the routing is feasible if the clock signal for the first subscriber identity module and the clock signal for the second subscriber identity module fulfill a pre-determined criterion.

In example 34, the subject-matter of example 33 can optionally include that the pre-determined criterion comprises that the clock signal for the first subscriber identity module and the clock signal for the second subscriber identity module are (or were) in a pre-determined state for a pre-determined period of time.

In example 35, the subject-matter of example 34 can optionally include that the pre-determined state is a high state.

In example 36, the subject-matter of any one of examples 34 or 35 can optionally include that the pre-determined state is a low state.

In example 37, the subject-matter of any one of examples 34 to 36 can optionally include that the pre-determined period of time comprises a time corresponding to a pre-determined number of clock cycles.

In example 38, the subject-matter of example 37 can optionally include that the pre-determined number of clock cycles is 1860.

In example 39, the subject-matter of any one of examples 29 to 38 can optionally include that the input data comprises a supply voltage for a first subscriber identity module and a supply voltage for a second subscriber identity module.

In example 40, the subject-matter of example 39 can optionally include that the routing change feasibility determination means for determining that the change of the routing is feasible if the supply voltage for the first subscriber identity module and the supply voltage for the second subscriber identity module fulfill a pre-determined criterion.

In example 41, the subject-matter of example 40 can optionally include that the pre-determined criterion comprises that the supply voltage for the first subscriber identity module and the supply voltage for the second subscriber identity module are below a pre-determined threshold voltage.

In example 42, the subject-matter of example 41 can optionally include that the pre-determined threshold voltage is 0.4 V.

Example 43 is a computer readable medium including program instructions which when executed by a processor cause the processor to perform a method for controlling a mobile radio communication, the computer readable medium further including program instructions which when executed by a processor cause the processor to perform: routing input data to a plurality of subscriber identity modules; in response to receiving a request for a change of the routing, determining based on the input data whether the change of the routing is feasible; and changing the routing if the change of the routing is feasible.

In example 44 the subject-matter of example 43 can optionally include program instructions which when executed by a processor cause the processor to perform: determining that the change of the routing is feasible if the plurality of subscriber identity modules are in a pre-determined condition.

In example 45, the subject-matter of example 44 can optionally include that the pre-determined condition comprises a condition in which the plurality of subscriber identity modules completed execution of all commands that were received.

In example 46, the subject-matter of any one of examples 43 to 45 can optionally include that the input data comprises a clock signal for a first subscriber identity module and a clock signal for a second subscriber identity module.

In example 47, the subject-matter of example 46 can optionally include program instructions which when executed by a processor cause the processor to perform: determining that the change of the routing is feasible if the clock signal for the first subscriber identity module and the clock signal for the second subscriber identity module fulfill a pre-determined criterion.

In example 48, the subject-matter of example 47 can optionally include that the pre-determined criterion comprises that the clock signal for the first subscriber identity module and the clock signal for the second subscriber identity module are (or were) in a pre-determined state for a pre-determined period of time.

In example 49, the subject-matter of example 48 can optionally include that the pre-determined state is a high state.

In example 50, the subject-matter of any one of examples 48 or 49 can optionally include that the pre-determined state is a low state.

In example 51, the subject-matter of any one of examples 48 to 50 can optionally include that the pre-determined period of time comprises a time corresponding to a pre-determined number of clock cycles.

In example 52, the subject-matter of example 51 can optionally include that the pre-determined number of clock cycles is 1860.

In example 53, the subject-matter of any one of examples 53 to 52 can optionally include that the input data comprises a supply voltage for a first subscriber identity module and a supply voltage for a second subscriber identity module.

In example 54, the subject-matter of example 53 can optionally include program instructions which when executed by a processor cause the processor to perform: determining that the change of the routing is feasible if the supply voltage for the first subscriber identity module and the supply voltage for the second subscriber identity module fulfill a pre-determined criterion.

In example 55, the subject-matter of example 54 can optionally include that the pre-determined criterion comprises that the supply voltage for the first subscriber identity module and the supply voltage for the second subscriber identity module are below a pre-determined threshold voltage.

In example 56, the subject-matter of example 55 can optionally include that the pre-determined threshold voltage is 0.4 V.

Example 57 is a control circuit comprising: a routing change request output configured to output a request for a change of a routing based on a received request and received input data, in response to receiving the request for the change of the routing of input data to a plurality of subscriber identity modules.

In example 58, the subject-matter of example 58 can optionally include that the routing change request output is configured to output the request if the plurality of subscriber identity modules are in a pre-determined condition.

In example 59, the subject-matter of example 58 can optionally include that the pre-determined condition comprises a condition in which the plurality of subscriber identity modules completed execution of all commands that were received.

In example 60, the subject-matter of any one of examples 57 to 59 can optionally include that the input data comprises a clock signal for a first subscriber identity module and a clock signal for a second subscriber identity module.

In example 61, the subject-matter of example 60 can optionally include that the routing change request output is configured to output the request if the clock signal for the first subscriber identity module and the clock signal for the second subscriber identity module fulfill a pre-determined criterion.

In example 62, the subject-matter of example 61 can optionally include that the pre-determined criterion comprises that the clock signal for the first subscriber identity module and the clock signal for the second subscriber identity module are (or were) in a pre-determined state for a pre-determined period of time.

In example 63, the subject-matter of example 62 can optionally include that the pre-determined state is a high state.

In example 64, the subject-matter of any one of examples 62 to 63 can optionally include that the pre-determined state is a low state.

In example 65, the subject-matter of any one of examples 62 to 64 can optionally include that the pre-determined period of time comprises a time corresponding to a pre-determined number of clock cycles.

In example 66, the subject-matter of example 65 can optionally include that the pre-determined number of clock cycles is 1860.

In example 67, the subject-matter of any one of examples 57 to 66 can optionally include that the input data comprises a supply voltage for a first subscriber identity module and a supply voltage for a second subscriber identity module.

In example 68, the subject-matter of example 67 can optionally include that the routing change request output is configured to output the request if the supply voltage for the first subscriber identity module and the supply voltage for the second subscriber identity module fulfill a pre-determined criterion.

In example 69, the subject-matter of example 68 can optionally include that the pre-determined criterion comprises that the supply voltage for the first subscriber identity module and the supply voltage for the second subscriber identity module are below a pre-determined threshold voltage.

In example 70, the subject-matter of example 69 can optionally include that the pre-determined threshold voltage is 0.4 V.

Example 71 is a method for controlling a change of a routing, the method comprising: in response to receiving a request for a change of provide a routing of input data to a plurality of subscriber identity modules outputting a request for a change of the routing based on the received request and the received input data.

In example 72, the subject-matter of example 71 can optionally include outputting the request if the plurality of subscriber identity modules are in a pre-determined condition.

In example 73, the subject-matter of example 72 can optionally include that the pre-determined condition comprises a condition in which the plurality of subscriber identity modules completed execution of all commands that were received.

In example 74, the subject-matter of any one of examples 71 to 73 can optionally include that the input data comprises a clock signal for a first subscriber identity module and a clock signal for a second subscriber identity module.

In example 75, the subject-matter of example 74 can optionally include outputting the request if the clock signal for the first subscriber identity module and the clock signal for the second subscriber identity module fulfill a pre-determined criterion.

In example 76, the subject-matter of example 75 can optionally include that the pre-determined criterion comprises that the clock signal for the first subscriber identity module and the clock signal for the second subscriber identity module are (or were) in a pre-determined state for a pre-determined period of time.

In example 77, the subject-matter of example 76 can optionally include that the pre-determined state is a high state.

In example 78, the subject-matter of any one of examples 76 to 77 can optionally include that the pre-determined state is a low state.

In example 79, the subject-matter of any one of examples 76 to 78 can optionally include that the pre-determined period of time comprises a time corresponding to a pre-determined number of clock cycles.

In example 80, the subject-matter of example 79 can optionally include that the pre-determined number of clock cycles is 1860.

In example 81, the subject-matter of any one of examples 71 to 80 can optionally include that the input data comprises a supply voltage for a first subscriber identity module and a supply voltage for a second subscriber identity module.

In example 82, the subject-matter of example 81 can optionally include outputting the request if the supply voltage for the first subscriber identity module and the supply voltage for the second subscriber identity module fulfill a pre-determined criterion.

In example 83, the subject-matter of example 82 can optionally include that the pre-determined criterion comprises that the supply voltage for the first subscriber identity module and the supply voltage for the second subscriber identity module are below a pre-determined threshold voltage.

In example 84, the subject-matter of example 83 can optionally include that the pre-determined threshold voltage is 0.4 V.

Example 85 is a control circuit comprising: a routing change request output means for outputting a request for a change of a routing based on a received request and received input data, in response to receiving the request for the change of the routing of input data to a plurality of subscriber identity modules.

In example 86, the subject-matter of example 85 can optionally include that the routing change request output means comprises outputting the request if the plurality of subscriber identity modules are in a pre-determined condition.

In example 87, the subject-matter of example 86 can optionally include that the pre-determined condition comprises a condition in which the plurality of subscriber identity modules completed execution of all commands that were received.

In example 88, the subject-matter of any one of examples 85 to 87 can optionally include that the input data comprises a clock signal for a first subscriber identity module and a clock signal for a second subscriber identity module.

In example 89, the subject-matter of example 88 can optionally include that the routing change request output means comprises outputting the request if the clock signal for the first subscriber identity module and the clock signal for the second subscriber identity module fulfill a pre-determined criterion.

In example 90, the subject-matter of example 89 can optionally include that the pre-determined criterion comprises that the clock signal for the first subscriber identity module and the clock signal for the second subscriber identity module are (or were) in a pre-determined state for a pre-determined period of time.

In example 91, the subject-matter of example 90 can optionally include that the pre-determined state is a high state.

In example 92, the subject-matter of any one of examples 90 to 91 can optionally include that the pre-determined state is a low state.

In example 93, the subject-matter of any one of examples 90 to 92 can optionally include that the pre-determined period of time comprises a time corresponding to a pre-determined number of clock cycles.

In example 94, the subject-matter of example 93 can optionally include that the pre-determined number of clock cycles is 1860.

In example 95, the subject-matter of any one of examples 85 to 94 can optionally include that the input data comprises a supply voltage for a first subscriber identity module and a supply voltage for a second subscriber identity module.

In example 96, the subject-matter of example 95 can optionally include that the routing change request output means comprises outputting the request if the supply voltage for the first subscriber identity module and the supply voltage for the second subscriber identity module fulfill a pre-determined criterion.

In example 97, the subject-matter of example 96 can optionally include that the pre-determined criterion comprises that the supply voltage for the first subscriber identity module and the supply voltage for the second subscriber identity module are below a pre-determined threshold voltage.

In example 98, the subject-matter of example 97 can optionally include that the pre-determined threshold voltage is 0.4 V.

Example 99 is a computer readable medium including program instructions which when executed by a processor cause the processor to perform a method for controlling a mobile radio communication, the computer readable medium further including program instructions which when executed by a processor cause the processor to perform: in response to receiving a request for a change of provide a routing of the input data to the plurality of subscriber identity modules, outputting a request for a change of the routing based on the received request and the received input data.

In example 100, the subject-matter of example 99 can optionally include program instructions which when executed by a processor cause the processor to perform: outputting the request if the plurality of subscriber identity modules are in a pre-determined condition.

In example 101, the subject-matter of example 100 can optionally include that the pre-determined condition comprises a condition in which the plurality of subscriber identity modules completed execution of all commands that were received.

In example 102, the subject-matter of any one of examples 99 to 101 can optionally include that the input data comprises a clock signal for a first subscriber identity module and a clock signal for a second subscriber identity module.

In example 103, the subject-matter of example 102 can optionally include program instructions which when executed by a processor cause the processor to perform: outputting the request if the clock signal for the first subscriber identity module and the clock signal for the second subscriber identity module fulfill a pre-determined criterion.

In example 104, the subject-matter of example 103 can optionally include that the pre-determined criterion comprises that the clock signal for the first subscriber identity module and the clock signal for the second subscriber identity module are (or were) in a pre-determined state for a pre-determined period of time.

In example 105, the subject-matter of example 104 can optionally include that the pre-determined state is a high state.

In example 106, the subject-matter of any one of examples 104 to 105 can optionally include that the pre-determined state is a low state.

In example 107, the subject-matter of any one of examples 104 to 106 can optionally include that the pre-determined period of time comprises a time corresponding to a pre-determined number of clock cycles.

In example 108, the subject-matter of example 107 can optionally include that the pre-determined number of clock cycles is 1860.

In example 109, the subject-matter of any one of examples 99 to 108 can optionally include that the input data comprises a supply voltage for a first subscriber identity module and a supply voltage for a second subscriber identity module.

In example 110, the subject-matter of example 109 can optionally include program instructions which when executed by a processor cause the processor to perform: outputting the request if the supply voltage for the first subscriber identity module and the supply voltage for the second subscriber identity module fulfill a pre-determined criterion.

In example 111, the subject-matter of example 111 can optionally include that the pre-determined criterion comprises that the supply voltage for the first subscriber identity module and the supply voltage for the second subscriber identity module are below a pre-determined threshold voltage.

In example 112, the subject-matter of example 1111 can optionally include that the pre-determined threshold voltage is 0.4 V.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A subscriber identity module data routing device comprising:
   a routing circuit configured to provide a routing of input data from a first subscriber identity module (SIM) to a first baseband; wherein the input data comprises at least one clock signal that is in a clock-stop mode for a pre-determined period of time;
   a routing change feasibility determination circuit configured to determine based on the input data whether a change of the routing of input data is feasible, in response to receiving a request for the change of the routing; and
   wherein the routing circuit is further configured to change the routing of input data of the first subscriber identity module to be routed from the first baseband to a second baseband if the routing change feasibility determination circuit determines that the change of the routing is feasible.

2. The subscriber identity module data routing device of claim 1,
   wherein the routing change feasibility determination circuit is configured to determine that the change of the routing is feasible if the plurality of subscriber identity modules being in a pre-determined condition.

3. The subscriber identity module data routing device of claim 2,
   wherein the pre-determined condition comprises a condition in which the plurality of subscriber identity modules completed execution of all commands that were received.

4. The subscriber identity module data routing device of claim 1, wherein the routing change feasibility determination circuit is configured to determine that the change of the routing is feasible if the clock signal for the first subscriber identity module and the clock signal for the second subscriber identity module fulfill a pre-determined criterion.

5. The subscriber identity module data routing device of claim 1,
   wherein the pre-determined period of time comprises a time corresponding to a pre-determined number of clock cycles.

6. The subscriber identity module data routing device of claim 1,
   wherein the input data comprises a supply voltage for a first subscriber identity module and a supply voltage for a second subscriber identity module.

7. The subscriber identity module data routing device of claim 6,
   wherein the routing change feasibility determination circuit is configured to determine that the change of the routing is feasible if the supply voltage for the first subscriber identity module and the supply voltage for the second subscriber identity module fulfill a pre-determined criterion.

8. The subscriber identity module data routing device of claim 7,
   wherein the pre-determined criterion comprises that the supply voltage for the first subscriber identity module and the supply voltage for the second subscriber identity module are below a pre-determined threshold voltage.

9. The subscriber identity module data routing device of claim 1, wherein the at least one clock signal comprises a clock signal for a first SIM and a clock signal for a second SIM.

10. A method for routing subscriber identity module data, the method comprising:
    routing input data from a first subscriber identity module (SIM) to a first baseband by a routing circuit;
    in response to receiving a request for a change of the routing, determining based on the input data whether the change of the routing of input data is feasible by a routing change feasibility determination circuit; wherein the input data comprises at least one clock signal that is in a clock-stop mode for a pre-determined period of time; and
    changing the routing of input data to be routed from the first subscriber identity module from the first baseband to a second baseband by the routing circuit if the change of the routing is feasible.

11. The method of claim 10, further comprising:
    determining that the change of the routing is feasible if the plurality of subscriber identity modules are in a pre-determined condition.

12. The method of claim 11,
    wherein the pre-determined condition comprises a condition in which the plurality of subscriber identity modules completed execution of all commands that were received.

13. The method of claim 10, further comprising:
    determining that the change of the routing is feasible if the clock signal for the first subscriber identity module and the clock signal for the second subscriber identity module fulfill a pre-determined criterion.

14. The method of claim 10,
    wherein the pre-determined period of time comprises a time corresponding to a pre-determined number of clock cycles.

15. The method of claim 10,
    wherein the input data comprises a supply voltage for a first subscriber identity module and a supply voltage for a second subscriber identity module.

16. The method of claim 15, further comprising:
    determining that the change of the routing is feasible if the supply voltage for the first subscriber identity module and the supply voltage for the second subscriber identity module fulfill a pre-determined criterion.

17. The method of claim 16,
    wherein the pre-determined criterion comprises that the supply voltage for the first subscriber identity module and the supply voltage for the second subscriber identity module are below a pre-determined threshold voltage.

18. A control circuit comprising:
a routing change request output configured to output a request for changing a routing of input data of a first subscriber identity module (SIM) from a first baseband to be routed to a second baseband based on a received request and received input data, in response to receiving the request for the change of the routing of input data; wherein the input data comprises at least one clock signal that is in a clock-stop mode for a pre-determined period of time.

19. The control circuit of claim 18,
wherein the routing change request output is configured to output the request if the plurality of subscriber identity modules are in a pre-determined condition.

20. A method for controlling a change of a routing, the method comprising:
in response to receiving a request for changing a routing of input data, outputting a request by a routing change feasibility determination circuit for changing the routing of input data of a first subscriber identity module to be routed from a first baseband to a second baseband based on the received request and the received input data; wherein the input data comprises at least one clock signal that is in a clock-stop mode for a pre-determined period of time.

21. The method of claim 20, further comprising:
outputting the request if the plurality of subscriber identity modules are in a pre-determined condition.

\* \* \* \* \*